United States Patent [19]

Reitmeier et al.

[11] Patent Number: 4,621,286

[45] Date of Patent: Nov. 4, 1986

[54] SPATIAL-TEMPORAL FREQUENCY INTERLEAVED PROCESSING OF A TELEVISION SIGNAL WITH REDUCED AMPLITUDE INTERLEAVED SECTIONS

[75] Inventors: Glenn A. Reitmeier; Curtis R. Carlson, both of Mercer County, N.J.

[73] Assignee: RCA Corporation, Princeton, N.J.

[21] Appl. No.: 615,094

[22] Filed: May 29, 1984

[51] Int. Cl.⁴ .................... H04N 7/00; H04N 7/12
[52] U.S. Cl. .................................... 358/141; 358/12
[58] Field of Search ............................ 358/12, 13, 141

[56] References Cited

U.S. PATENT DOCUMENTS

| 2,686,831 | 8/1954 | Dome ........................... 358/12 |
| 2,716,151 | 8/1955 | Smith .......................... 358/12 |
| 3,871,019 | 3/1975 | Bingham ....................... 358/12 |

FOREIGN PATENT DOCUMENTS

| 57826 | 8/1982 | European Pat. Off. . |
| 3344524 | 6/1985 | Fed. Rep. of Germany ........ 358/12 |

OTHER PUBLICATIONS

B. Wendland, "High Definition Television Studies on Compatible Basis with Present Standards", SMPTE's-Television Technology in the 80s-1981.
Journal, SMPTE, Oct. 1984, "Experiments on Proposed Extended-Definition TV with Full NTSC Compatibility", by T. Fukinuki, et al, pp. 923-929.

Primary Examiner—John W. Shepperd
Attorney, Agent, or Firm—Eugene M. Whitacre; Paul J. Rasmussen; Joseph J. Laks

[57] ABSTRACT

The image represented by a video signal contains an associated image spectrum defined within a spatial-temporal frequency volume. From this video signal, a second video signal is produced that represents spatial-temporal carrier modulation of a spectral section of the image spectrum into an interleaved location adjacent the image spectrum. To reduce the visibility of aliasing artifacts, the interleaved spectral section is made to be of reduced amplitude relative to its original amplitude in the image spectrum. To reconstruct the spatial-temporal frequency spectrum of the image at the television receiver, the video signal containing the frequency interleaved spectrum is processed in a complementary manner that represents spatial-temporal carrier modulation of the interleaved section to restore that section to its original position in the image spectrum. At the same time, the amplitude of the restored section is increased.

13 Claims, 17 Drawing Figures

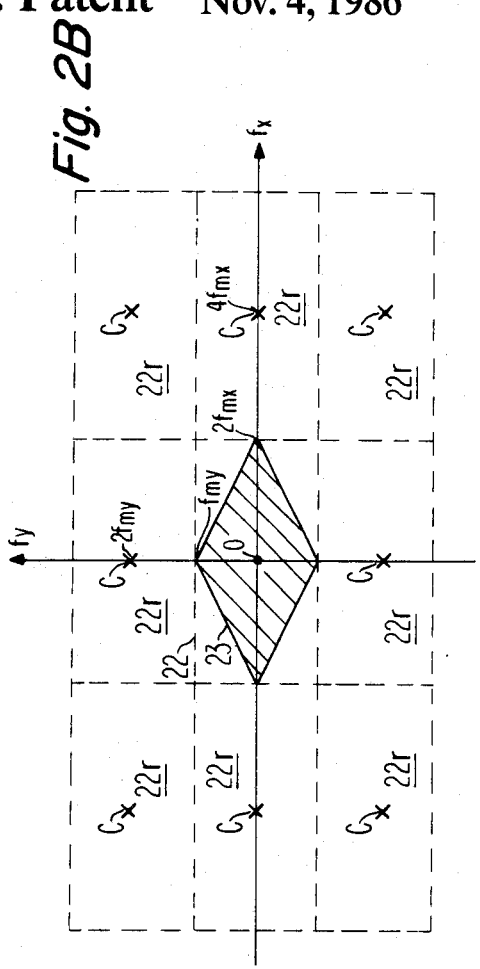
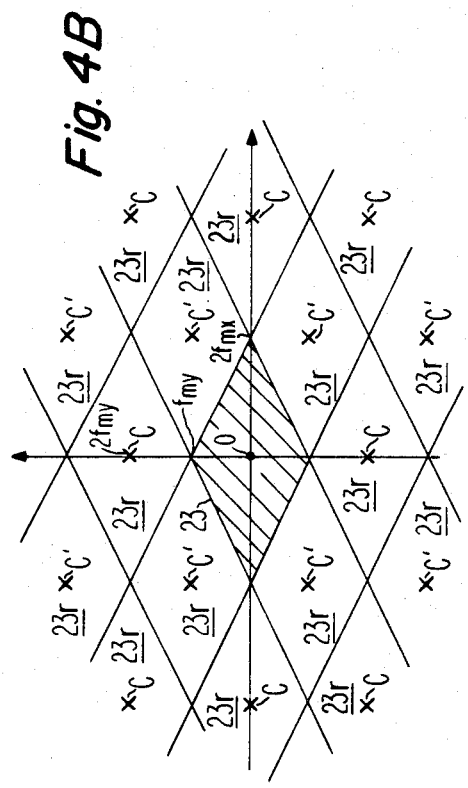
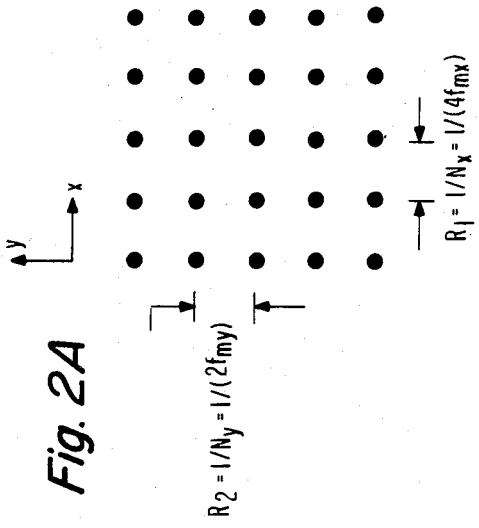
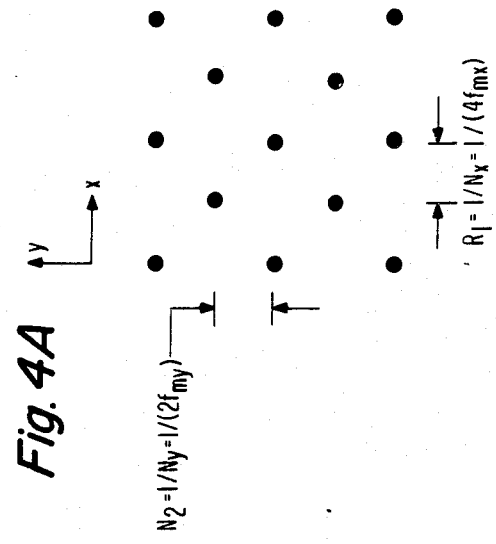

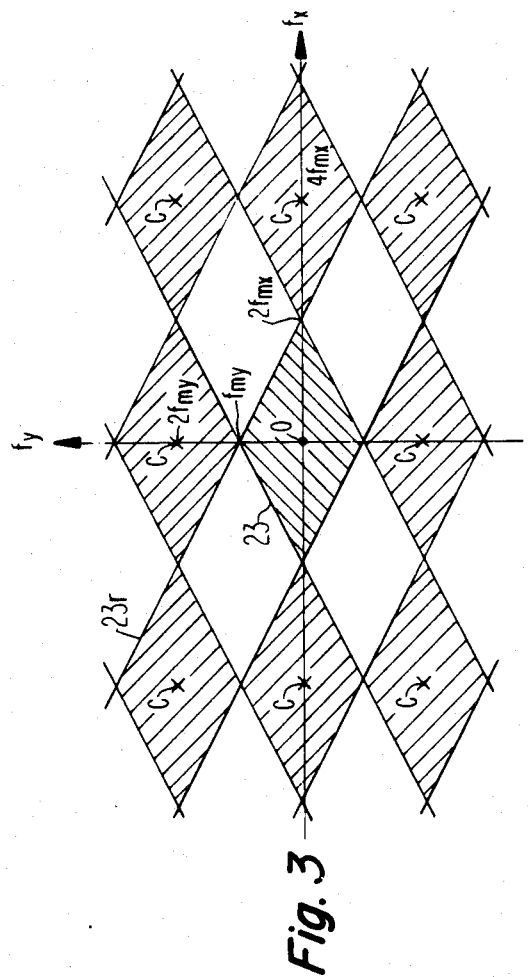
Fig. 3
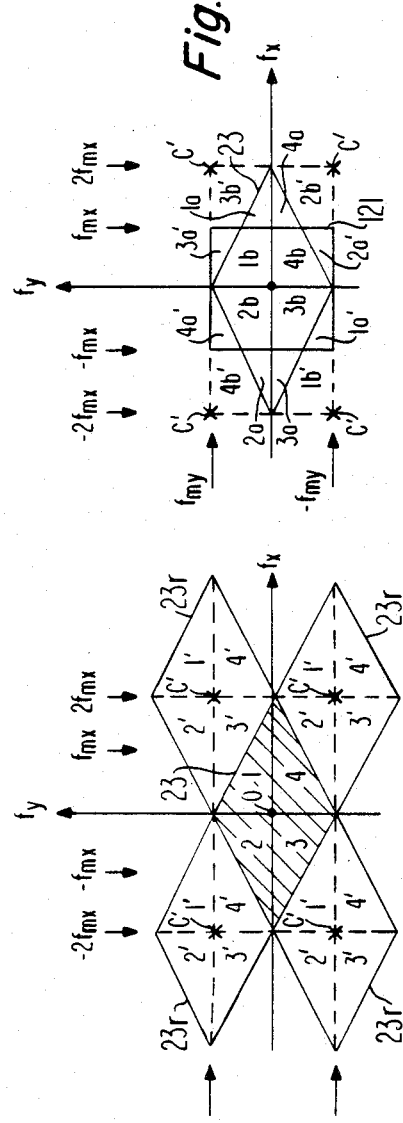
Fig. 4D
Fig. 4C

SPATIAL-TEMPORAL FREQUENCY INTERLEAVED PROCESSING OF A TELEVISION SIGNAL WITH REDUCED AMPLITUDE INTERLEAVED SECTIONS

This invention relates to spatial-temporal frequency interleaving of a video signal.

A desirable aspect of high definition television is a picture that is sharper and more pleasing than is provided by broadcast and television receiver equipment presently in general use. Some of the features proposed for a high definition television system include the following: increasing the line rate over the conventional 525 or 625 lines per frame to, for example, 1,050 or 1,250 lines per frame, extending the aspect ratio from a conventional 4:3 aspect ratio to an aspect ratio such as 5:3, and increasing the effective resolution of the picture.

A high definition television system that attempts to provide most or all of these features has heretofore required either a substantial increase in bandwidth of the transmission channel or a substantial compromise in the specifications for one or more of the features described above. Spatial-temporal frequency interleaving techniques may be used to rearrange the spatial-temporal frequency spectrum of the image in such a way as to reduce the channel bandwidth requirement for transmission of the image without substantially reducing the desired information content of the image.

The concept of spatial-temporal frequency interleaving involves the separation of high spatial and/or temporal frequency information of an image and modulating this information on a spatial-temporal carrier which interleaves the high frequency information with the low frequency information of the baseband spectrum. An advantage of interleaving high frequency information is that since the eye is relatively insensitive to distortion at high spatial frequencies, artifacts introduced by the interleaving will, in general, not be objectionable.

When the high definition television signal processing system incorporates sampling techniques, high frequency carriers are inherently introduced in the form of spectral repeat centers by means of the sampling procedure. Great flexibility is available in selecting the carriers or repeat centers at particular points in the spatial-temporal frequency volume. The effect of using spatial-temporal carrier generation is to reconfigure the spectrum of the image, transmitting a portion of the baseband spectrum in a different location of the spatial-temporal frequency volume.

The sampling or equivalent carrier modulation tends to introduce a full-strength alias which could result in undesirable artifacts being displayed together with the picture information. In accordance with an aspect of the invention, the effects of aliasing are substantially reduced by transmitting the interleaved spectral section with diminished amplitude relative to a remaining spectral section of the transmitted video signal. At the receiver, a complementary process is performed that represents spatial-temporal carrier modulation of the spatial-temporal frequency interleaved video signal. The interleaved section is restored to its original position in the image spectrum, while, at the same time, its amplitude is increased.

FIGS. 1A, 1B, 2A, 2B, 3, 4A through 4D illustrate spatial frequency spectra at various points in the frequency interleaving process;

By way of illustration only, assume that it is desired to reconfigure the transmitted luminance spatial frequency spectrum of an image so that the spectrum better matches the properties of the human visual system. For the purposes of this discussion only, assume that the original baseband spatial frequency spectrum, $f_x$ versus $f_y$, of a video signal is rectangular, as illustrated in FIG. 1A, by rectangle 22, where $f_x$ is measured in cycles per picture width and $f_y$ is measured in cycles per picture height.

Figure 1B:
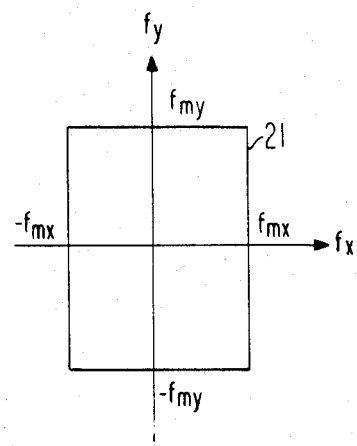

One of the factors determining the maximum horizontal spatial resolution transmitted is the bandwidth of the channel allocated to carry the video signal. Channel bandwidth is therefore an important factor in determining the maximum horizontal spatial frequency, $f_{mx}$, of the image being transmitted. Vertical resolution, as measured by the maximum vertical spatial frequency $f_{my}$, is a function of the number of lines scanned per frame. Thus, in a conventional transmission system, only the spatial frequency spectrum bounded by rectangle 21 of FIG. 1B is transmitted.

Figure 1A:
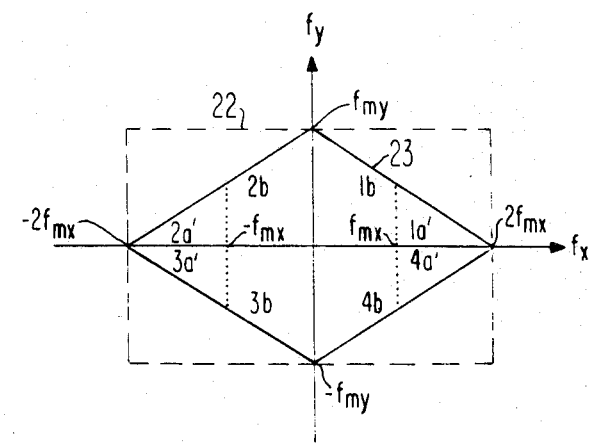

Experiments have indicated, however, that the human visual response to spatial frequencies is limited to be within a diamond shaped area as suggested by the spatial frequency spectrum 23 of FIG. 1A. The diamond shaped area 23 of FIG. 1A may have the same Nyquist area as the rectangular shaped area 21 of FIG. 1B. Thus, an improvement in the displayed image quality may be realized by decreasing the diagonal resolution available in the frequency spectrum of FIG. 1B in exchange for increasing either vertical or horizontal resolution. In FIG. 1A, the increased resolution is in the horizontal direction. The horizontal spatial frequencies in diamond-shaped spectrum 23 of FIG. 1A extend out to a frequency $2f_{mx}$, twice the maximum spatial frequency in the horizontal direction of the spectrum of FIG. 1B. A signal having a spectrum like that of area 23 of FIG. 1A may be transmitted through the same narrowband transmission channel used to transmit a signal having a spectrum like that of FIG. 1B.

Before frequency interleaving is attempted so as to permit the transmission of an image containing $2f_{mx}$ horizontal resolution, the signal is diagonally filtered to change the spatial frequency spectrum of the signal from that of dashed-line rectangle 22 to that of diamond-shaped area 23. To simplify the hardware, the filtering may be performed digitally. First, the image is sampled in the horizontal direction according to the orthogonal sampling point grid of the x-y image space of FIG. 2A, with sampling points being indicated by the solid dots. In accordance with Nyquist's theorem, to preserve the original $2f_{mx}$ resolution in the horizontal direction, the image must be sampled in the horizontal direction at twice the maximum horizontal spatial frequency that occurs in the image. Thus, if $N_x$ represents the number of samples per picture width, then to satisfy Nyquist's criteria, $N_x=1/(4f_{mx})$. The period $R_1$ between horizontal samples of the orthogonal sampling grid of FIG. 2A is $R_1=1/N_x=1/(4f_{mx})$. The period $R_2$ between vertical samples of FIG. 2A is $R_2=1/N_y=1/(2f_{my})$, where the value of $N_y$ equals the number of lines per picture height.

The two-dimensional orthogonal sampling procedure schematically illustrated by the sampling point grid of FIG. 2A gives rise to a plurality of rectangular repeat spectra 22r in the spatial frequency domain, as illustrated in FIG. 2B. The repeat spectra 22r have repeat centers C that form an orthogonal grid with frequency spacing in the horizontal direction of $4f_{mx}$ and in the vertical direction, of $2f_{my}$. Each of the repeat spectra 22r ideally contains substantially the same picture information as contained in the baseband spectrum 22 that is centered about the origin O.

The sampled signal is then two-dimensionally digitally filtered to filter the baseband spectrum into the diamond-shaped area 23 and filter the repeat spectra into diamond-shaped areas 23r, as indicated by all the shaded areas of FIG. 3.

The next step in the frequency interleaving process is the appropriate subsampling of the signal to create additional repeat spectra in the void areas adjacent the baseband spectrum 23 of FIG. 3. By choosing quincunx subsampling, one may locate additional repeat spectra in a complementary and nonoverlapping manner with respect to the existing diamond-shaped baseband spectrum 23 and diamond-shaped repeat spectra 23r of FIG. 3. One type of quincunx subsampling is the field quincunx sampling procedure illustrated by the sampling point grid of FIG. 4A. Other quincunx subsampling such as line and frame quincunx subsampling may be used.

In field quincunx subsampling, alternate ones of the original pixels are discarded on a line-interleaved basis. The sampling point grid that results is illustrated in FIG. 4A and forms a non-orthogonal quincunx, or figure-of-five pattern. The field quincunx subsampling may be achieved by subsampling interlaced video lines at half the original horizontal sampling rate and by additionally altering the phase of the sampling clock on a field-by-field basis, as will be later explained.

The effect of field quincunx subsampling in the frequency domain is illustrated in FIG. 4B. Additional repeat spectra 23r are introduced having repeat centers C' such that the origin O of any one of the repeat centers C or C', together with the corresponding 4 adjacent repeat centers, form a figure-of-five pattern. The shape of the additional repeat spectra 23r is identical to the shape of baseband spectrum 23. The repeat center C' is spaced apart from another center C' by an amount $4f_{mx}$ in the horizontal direction and $2f_{my}$ in the vertical direction.

FIG. 4C illustrates a portion of the frequency space of FIG. 4B that includes only those repeat spectra 23r that are adjacent to baseband spectrum 23 and are centered on repeat centers C'. In FIG. 4C, one may partition the baseband frequency spectrum 23 into four sections, 1, 2, 3, 4. Corresponding sections, containing identical image and spatial frequency content but centered around a repeat center C', are identified as sections 1', 2', 3', 4'.

After subsampling has been performed, the signal is postfiltered to keep the spatial frequencies of the signal within the limits required for transmission through a limited bandwidth channel. Assume, illustratively, that for various reasons, including limited channel bandwidth, it is desirable to transmit a signal having associated therewith spatial frequencies no greater than $f_{mx}$. Thus, for example, when using field quincunx subsampling on a signal that has a diamond-shaped baseband area 23 of FIG. 4B, wherein the signal has horizontal spatial frequencies extending to a maximum frequency of $\pm 2f_{mx}$, postfiltering of the quincunx subsampled signal is performed to limit the extent of the horizontal spatial frequencies to a maximum of $\pm f_{mx}$. Postfiltering need not be performed to remove repeat spectra associated with repeat centers having locations on the vertical axis $f_y$, since the scanning processes at the camera and the television receiver combine to attenuate such spectra. For simplicity such repeat spectra are not illustrated in FIG. 4D.

The resultant transmitted spatial frequency spectrum after post-filtering has the rectangular shape of solid line rectangle 121 of FIG. 4D, with a horizontal cutoff at the frequency $f_{mx}$ and a vertical cutoff at the frequency $f_{my}$. The total Nyquist area bounded by solid-line rectangle 121 of FIG. 4D is the same as the total Nyquist area of the baseband diamond-shaped spectrum 23.

In addition, because of spatial frequency interleaving, the image content of the entire baseband spectrum 23 has been preserved in rectangular shaped spectrum 121 of FIG. 4D without loss of baseband frequency information. The baseband information for frequencies extending beyond $f_{mx}$, originally located in triangular sections 1a, 2a, 3a and 4a of diamond-shaped baseband spectrum 23 of FIG. 4D, have been repositioned into the corners of rectangular frequency spectrum 121 as the corresponding triangular sections 1a', 2a', 3a' and 4a' of the repeat spectra associated with the four adjacent centers C'.

In FIG. 4D, frequency sections 1a, 2a, 3a, 4a, of baseband spectrum 23 have been removed due to the low frequency cutoff $f_{mx}$ produced by postfiltering of the quincunx subsampled signal. However, as a result of quincuinx subsampling, complementary sections 1a', 2a', 3a', 4a', of respective adjacent repeat spectra have been substituted or interleaved with remaining sections 1b, 2b, 3b, 4b, of baseband spectrum 23.

One notes that a limited bandwidth channel is now capable of transmitting high spatial frequency content information by rearranging the original spectrum to fill up the entire Nyquist area of the transmitted signal.

At the receiver, the original baseband spectrum, such as the diamond-shaped baseband spectrum 23 of FIG. 1A, may be reconstructed from a signal having a spatial frequency spectrum such as rectangular spectrum 121 of FIG. 4D by means of a complementary quincunx subsampling process.

The use of subsampling for frequency interleaving a high definition television signal is comparable in analog processing to modulating the signal on a subcarrier in order to interleave the high spatial frequency information with the low spatial frequency information, as explained below. This procedure, however, introduces a full strength alias which could result in undesirable artifacts being displayed together with the picture information. According to an aspect of the invention, the amplitude of the subcarrier of a spatial frequency interleaved high definition television signal is reduced in order to reduce the effects of aliasing.

Figure 9A:
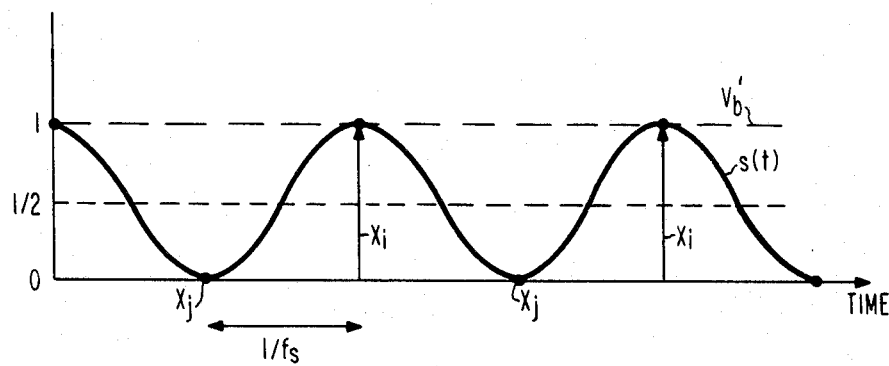
FIG. 9A illustrates a signal modulated carrier and sample points there that is useful in explaining quincunx subsampling.

To explain the origin of the aliasing, assume that the quincunx subsampling of the digitized video signal is arranged so as to supply a digital sample of zero value between every two real samples in the sampling grid of FIG. 4A. FIG. 9A illustrates real subsamples $x_i$ of the video signal $V'_b$, where the signal $V_b'$ is the analog equivalent of the digitized video signal after spatial low pass filtering. The samples $x_j$ of FIG. 9A represent the alternate, fictitious samples of zero value. In FIG. 9A, a carrier signal s(t) may be drawn that has maxima and minima corresponding to the values of the samples $x_i$ and $x_j$, respectively. Thus, from FIG. 9A one may conclude that the subsampling procedure is equivalent to multiplying the video signal $V'_b$ by the carrier signal $$s(t) = \tfrac{1}{2} + \tfrac{1}{2} \cos(\pi f_s t).$$

Figure 9B:
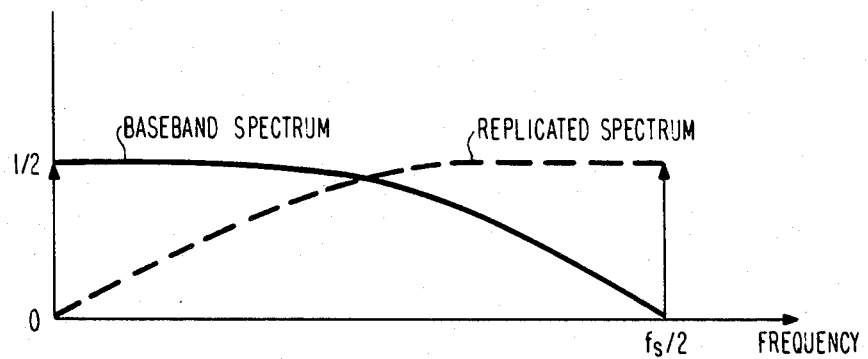
FIG. 9B illustrates the frequency spectrum of the signal modulated carrier of FIG. 9A.

The frequency spectrum of the video modulated carrier signal $V'_b \cdot s(t)$ is similar to the one illustrated in FIG. 9B. The spectrum includes the solid line baseband spectrum out to the frequency $f_s/2$ and a dashed-line replicated spectrum illustratively having maximum amplitude at the frequency $f_s/2$ and decreasing toward zero as the origin is approached.

One notes from FIG. 9B that the replicated spectrum is at full amplitude compared to the baseband spectrum. In accordance with one aspect of the invention, it is desirable to reduce the amplitude of the replicated spectrum relative to the baseband spectrum to avoid the introduction of objectionable artifacts in the displayed picture.

Figure 10A:
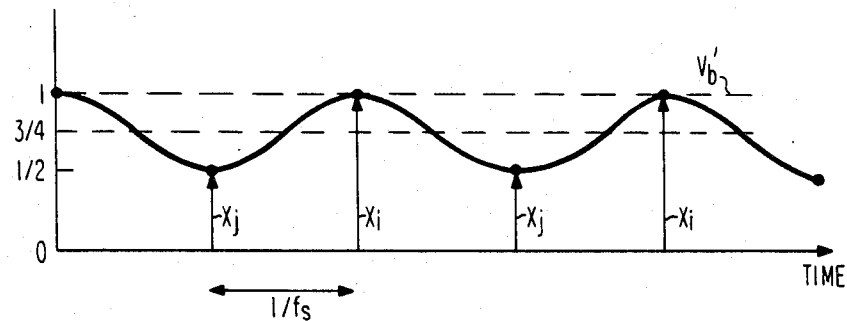
FIG. 10A illustrates a signal modulated carrier with sample points thereon wherein alternate samples of the signal modulated carrier are of reduced amplitude, in accordance with an aspect of the invention.

To reduce the amplitude of the replicated spectrum, the signal $V'_b$ is sampled at the $f_s$ rate and the value of every other sample is reduced below its unity value, but to a nonzero value. As illustrated in FIG. 10A, the original samples $x_i$ retain their original unity values; the alternate samples $x_j$ are of reduced value.

The effect of reducing the value of samples $x_j$ is the equivalent of carrier modulating the signal $V'_b$ by the signal $$s'(t) = (1-c) + (c) \cos(\pi f_s t),$$

where c is greater than zero but less than 1. For illustrative purposes, $c = \tfrac{1}{4}$ in FIG. 10A.

Figure 10B:
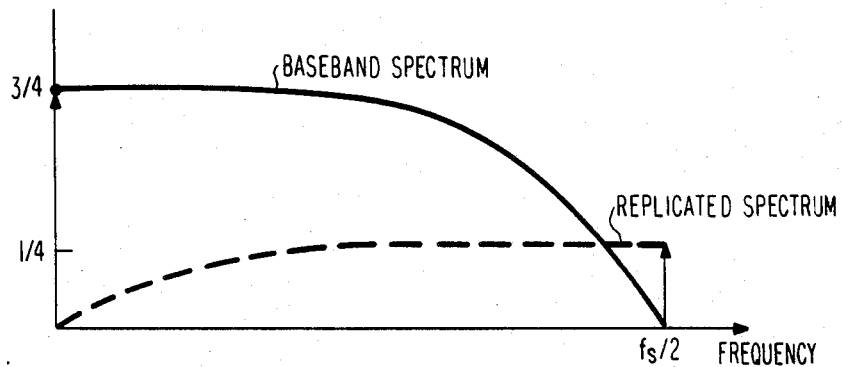
FIG. 10b illustrates the frequency spectrum of the signal modulated carrier of FIG. 10A.

The spectrum of the carrier modulated signal $V'_b \cdot s(t)$ is illustrated in FIG. 10B and includes the original baseband spectrum and a replicated spectrum that is substantially reduced in amplitude compared to the baseband spectrum. For the example of $c = \tfrac{1}{4}$ the replicated spectrum is reduced to $\tfrac{1}{3}$ the amplitude of the baseband spectrum, thereby reducing the noticeability of any artifacts caused by aliasing.

Figure 5:
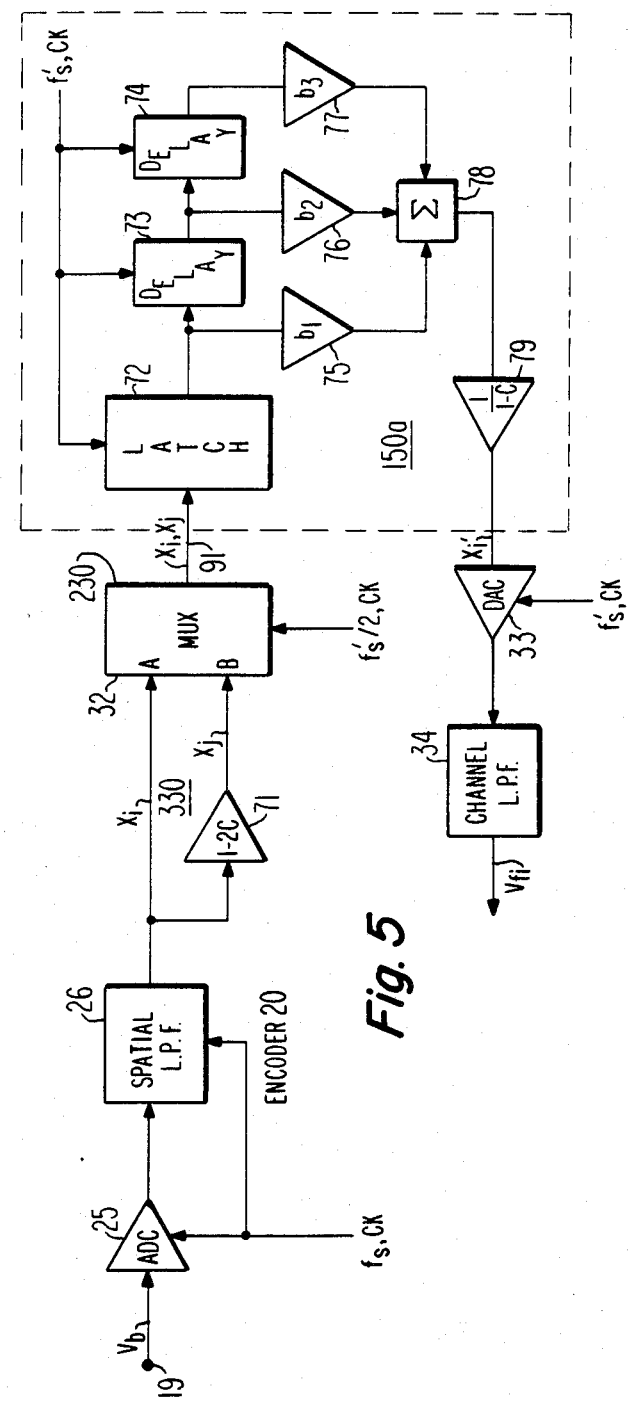
FIG. 5 illustrates a spatial-temporal frequency interleaving encoder, embodying the invention, wherein the interleaved section is of reduced amplitude.

FIG. 5 illustrates an encoder 20 which implements the spatial-temporal frequency interleaving technique previously described, including a reduced amplitude carrier quincunx switching stage 330, embodying the invention. In FIG. 5, a two-to-one interlaced baseband video signal $V_b$, such as the luminance signal component, by way of example, in a time division multiplexed component format, such as a conventional multiplexed analog component or MAC format prior to compression, is developed at a terminal 19. The baseband video signal may be obtained from conventional camera and studio hardware, not illustrated, and has a spatial frequency spectrum of a rectangular shape such as spectrum 22 of FIG. 1A, with horizontal frequencies extending to a frequency $2f_{mx}$ and vertical frequencies extending to $f_{my}$. Repeat spectra existing due to the scanning process and having repeat centers on the $f_y$ axis are not illustrated as they are of no importance for the purposes of this discussion.

Figure 7:
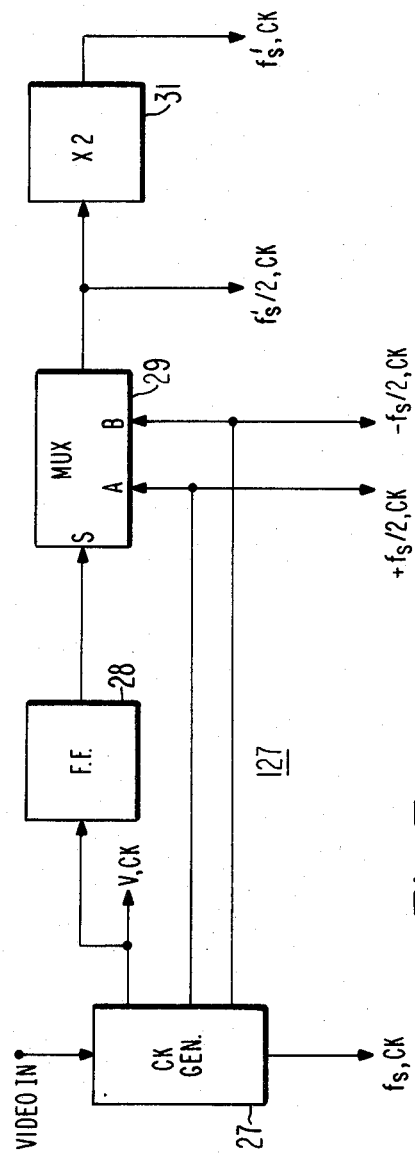
FIG. 7 illustrates a clocking system that generates various clock signals for the encoder of FIG. 5 and the decoder of FIG. 6.

Baseband video signal $V_b$ is applied to a clock generator 27 of a clocking system 127, illustrated in FIG. 7, that generates clock signals for frequency interleaving encoder 20 and that is synchronized with the synchronizing information in the baseband video signal. Clock generator 27 generates a clock signal V,ck at the field rate of the baseband video signal and generates several sampling and subsampling clocks for the various digital sections of encoder 20 of FIG. 5.

In FIG. 5, baseband video signal $V_b$ is applied to an analog-to-digital converter, ADC 25, for sampling the signal at a sampling rate $f_s$ in response to a clock signal $f_s$,ck developed by clock generator 27 of FIG. 7. The sampling rate $f_s$ is selected so as to produce sample points in the sampling grid of FIG. 2A that are spaced apart by the distance $R_1$. Thus, the spatial frequency spectrum of the digitized video signal at the output of ADC 25 is that of the one shown in FIG. 2B with a baseband rectangular spectrum 22 and replicated rectangular spectrums 22r centered on the repeat centers C.

The digitized and sampled video signal is then applied to a spatial low pass filter 26 that filters baseband spectrum 22 into diamond-shaped baseband area 23 of FIG. 3 and filters repeat spectra 22r into diamond-shaped repeat spectra 23r. Spatial low pass filter 26 may be any one of several conventional type digital filters such as a maximally flat filter of order N. The higher the order of the filter, the sharper the frequency cutoff characteristics of the filter. However, the higher the order of the filter, the more complex is the hardware required to implement the filter. On the otherhand, sharp cutoff spatial filters may introduce perceptually undesirable sidelobes into the image space of the transformed spatial frequency impulse response functions. The filter also incorporates a field store to enable the filter to process adjacent lines of the interlaced signal. If a non-interlaced signal were to be processed, then the filter would not require a full-field store.

After the signal has been filtered into diamond-shaped baseband and repeat spectra, the signal is reconfigured in its spatial frequencies to satisfy the bandwidth requirements imposed upon it by the transmission channel used. For example, assume the bandwidth of the channel that receives the frequency interleaved signal from the output of encoder 20 has a limited bandwidth that enables the transmission of horizontal spatial frequencies only up to a maximum frequency of $f_{mx}$. A field quincunx sampling technique such as described previously may be used to reconfigure the baseband frequency spectrum 23 of FIG. 4C to a rectangular frequency spectrum 121 of FIG. 4D.

To accomplish this reconfiguration, the output of spatial low pass filter 26 of FIG. 5 is applied to a quincunx switch 330 that produces field quincunx subsampling of the video signal in the sampling pattern illustrated in FIG. 4A. Switch 330 passes through unmodified to output line 91 every other one of the input samples $x_i$ obtained from low pass filter 26. This pass through is performed on a phase alternating, field-by-field basis, in response to the application of the half rate sampling clock signal $f'_s/2,ck$ to multiplexer 230 of switch 330.

The signal $f'_s/2,ck$ is generated by clocking system 127 of FIG. 7 by selecting alternately, on a field-by-field basis, one of two available clock signals $+f_s/2,ck$ and $-f_s/2,ck$ developed by clock generator 27. The two clock signals, $\pm f_s/2,ck$, are 180° out-of-phase with each other and are synchronized with and have one-half the frequency of the sampling clock signal $f_s,ck$ of ADC 25.

To produce the correct switching of quincunx switch 330, the signal V,ck toggles a T-type flip-flop 28 to develop on a field alternating basis high and low states at the output of the flip-flop. The output of flip-flop 28 is coupled to the select input terminal S of a multiplexer MUX 29. The signal $+f_s/2,ck$ is applied to the A input and the signal $-f_s/2,ck$ is applied to the B input. The output of MUX 29 is the clocking signal $f'_s/2,ck$ needed to produce the quincunx subsampling operation of switch 330.

The samples $x_i$ at the output of spatial low pass filter 26 of FIG. 5 are also applied to a coefficient multiplier 71 which multiplies the samples $x_i$ by the coefficient $(1-2c)$ to develop the samples $x_j$ at the B input of multiplexer 230. By clocking the select input terminal S with the clock signal $Fs\frac{1}{2},ck$, a stream of samples $x_i$ and $x_j$ are produced in the form illustrated in FIG. 10A. Due to the reduced amplitude spatial carrier equivalent to the reduced amplitude carrier of FIG. 10A, the amplitudes of the spatial frequencies in sections $1'$ through $4'$ of the replicated spectra 23r of FIGS. 4C and 4D are of reduced amplitude relative to the frequencies in baseband sections 1 through 4.

Because of quincunx sampling, the spectrum of the sampled video signal, samples $x_i$, $x_j$, at the output of switch 330, is the one shown in FIG. 4B, having a diamond-shaped baseband spectrum 23 together with repeat spectra 23r located not only around repeat centers $C'$ but also around repeat centers C. To obtain the rectangular spectrum 121 of FIG. 4D at the lower horizontal cutoff frequency of $f_{mx}$, the video samples $x_i$, $x_j$ are applied to a horizontal low pass filter 150a.

In filter 150a, the samples $x_i$, $x_j$ are stored in a latch 72 clocked by the clock signal $f'_s,ck$. The clock signal $f'_s,ck$ is developed by clocking system 127 of FIG. 7 from the $f'_s/2,ck$ signal by frequency doubling in a doubler stage 31. The samples are then clocked out of latch 72 to a two-stage delay comprising delay stages 73 and 74. Additionally, the samples at the output of latch 72 are multiplied by a coefficient multiplier 75 and then applied to an adder 78. The samples developed at the output of delay stage 73 are multiplied by a coefficient multiplier 76 and then applied to adder 78. The samples at the output of delay stage 74 are multiplied by coefficient multiplier 77 and then applied to adder 78. The samples at the output of adder 78 are multiplied by coefficient multiplier 79 to produce the frequency interleaved digital samples $x'_i$ of FIG. 5. To preserve overall unity gain between the samples $x_i$, $x_j$ and the samples $x'_i$, the value of coefficient multiplier 79 is $1/(1-c)$.

The video samples $x'_i$ developed at the output of filter 150a have the frequency interleaved baseband spectrum of rectangular baseband spectrum 121 illustrated in FIG. 4D. All the picture information of the original signal samples developed at the output of spatial low pass filter 26 is contained in the frequency interleaved spectral signal of samples $x'_i$, but rearranged so as to accommodate the narrowband transmission requirements.

The digital video samples $x'_i$ are applied to a digital-to-analog converter DAC 33 to generate an analog frequency interleaved baseband video signal having the rectangular baseband spectrum 121 of FIG. 4D. This signal is then passed through a channel low pass filter 34 prior to being sent to the transmitter stage, for transmission by way of broadcast, cable or other suitable transmission media. Channel low pass filter 34 has a horizontal spatial frequency cutoff of $f_{mx}$ to match the transmitter channel bandwidth limitations. The frequency interleaved video signal $V_{fi}$ developed at the output of filter 34 contains the rectangular baseband spectrum 121 of FIG. 4D. Not illustrated in FIG. 5 are the additional, conventional stages of MAC processing that compresses the luminance signal and combines it with the compressed chrominance signal, the reference burst or other timing signal and the pulse code modulated portion to obtain a MAC formatted signal.

Figure 6:
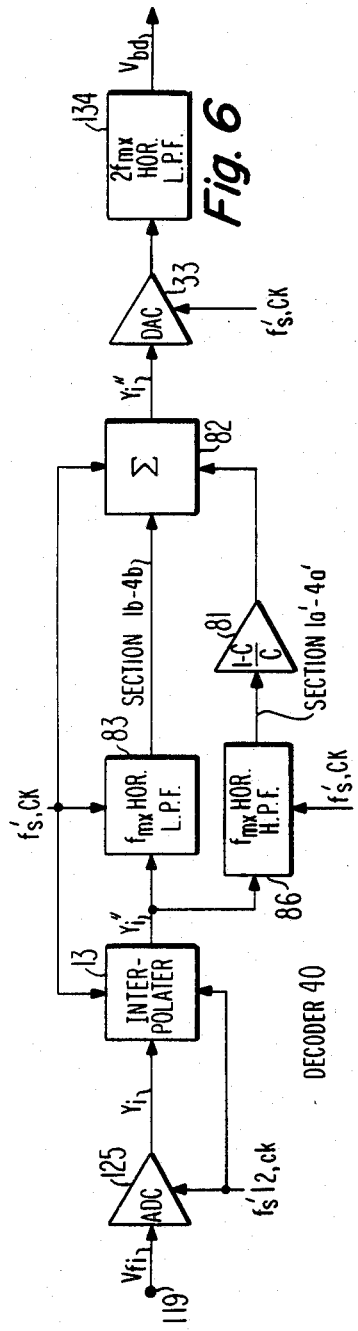
FIG. 6 illustrates a spatial-temporal frequency interleaved decoder, embodying the invention, wherein the frequency interleaved section is restored to its original position in the image spectrum while at the same time having its amplitude increased.

FIG. 6 illustrates a decoder 40 in the television receiver that will reconstruct the diamond-shaped baseband spectrum 23 of FIG. 1B from the frequency interleaved baseband video signal $V_{fi}$ produced by frequency interleaving encoder 20 of FIG. 5. After the transmitted video signal has been received by the television receiver and processed by the front end stages, such as the tuner and IF stages, assuming transmission by way of an RF modulated broadcast carrier, and has been demultiplexed and decompressed in a MAC processor, the baseband frequency interleaved video signal $V_{fi}$ is developed at a terminal 119 of FIG. 6. Items of FIGS. 5 and 6 that are similarly identified function in a similar manner or represent similar quantities. Additionally, the same clocking system 127 of FIG. 7 may be used to generate the various clock signals for decoder 40.

As the first step in reconstructing the diamond shaped baseband spectrum, the frequency interleaved video signal $V_{fi}$ is quincunx subsampled at the half sampling rate of $f_s/2$, in order to generate signal samples $y_i$. Due to quincunx sampling, the frequency spectrum of the signal samples $y_i$ is that of the frequency spectrum of FIG. 4B. To perform the quincunx subsampling, while at the same time digitizing analog signal $V_{fi}$, an analog-to-digital converter ADC 125 receives frequency interleaved signal $V_{fi}$ and subsamples it in a quincunx manner in accordance with the clocking signal $f'_s/2,ck$.

Figure 8:
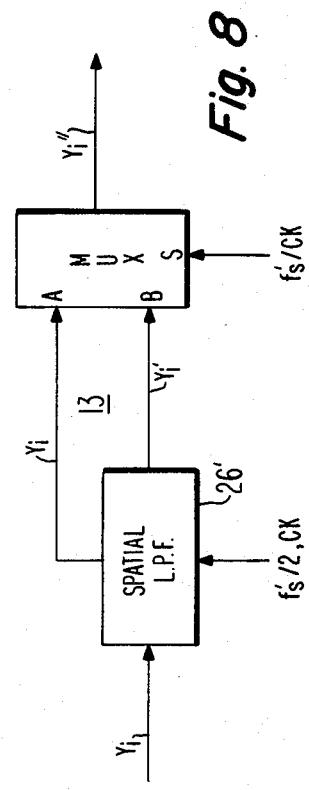
FIG. 8 illustrates a specific embodiment of the interpolator of FIG. 6.

The subsampled signal $Y_i$ is applied to an interpolator 13 that produces digital samples $Y''_i$ at its output at an increased rate of $f_s$. A specific embodiment of interpolater 13 is illustrated in FIG. 8, including a spatial low pass filter 26'. The function of spatial low pass filter 26' is to filter the signal samples $y_i$ to remove all the repeat spectra 23r of FIG. 4B that are located about the repeat centers $C'$. Samples $y'_i$ at the output of spatial low pass filter 26' are coupled to the B input of a multiplexer MUX 32. The unprocessed samples $y_i$, obtained at a suitable tap of filter 26', are coupled to the A input. Digital samples $y''_i$ are developed at an $f_s$ rate at the output of MUX 32. Digital samples $y''_i$ alternate between unprocessed samples $y_i$ and interpolated samples $y'_i$ and contain the spatial frequency spectrum of FIG. 3, including baseband spectrum 23 of FIG. 1A.

Due to the technique, previously described, of reducing the amplitude of the modulated carrier, reconstructed sections $1a'$ through $4a'$ of FIG. 1A contained in the samples $y''_i$ are still of reduced amplitude. To restore these frequencies and these sections to their original amplitude, the samples $y''_i$ are horizontally high pass filtered, multiplied by a gain factor of $(1-c)/c$ and then added back to the original samples $y''_i$ after these same samples $y''_i$ have been horizontally low pass filtered.

As illustrated in FIG. 6, samples $y''_i$ at the output of interpolator 13 are coupled to a horizontal high pass filter 86 that removes horizontal spatial frequencies smaller in magnitude than $f_{mx}$. The baseband spectrum of the output of high pass filter 86 contains only sections $1a'$ through $4a'$. The output samples of high pass filter 86 are coupled to a coefficient multiplier 81 that results in the restoration of sections $1a'$ through $4a'$ to their full amplitude.

Samples $y''_i$ at the output of interpolator 13 are also coupled to a horizontal low pass filter 83 that removes all spatial frequencies extending beyond $\pm f_{mx}$. The baseband spectrum of the output of low pass filter 83 contains only sections $1b$ through $4b$ of FIG. 1A.

The samples at the outputs of horizontal low pass filter 83 and coefficient multiplier 81 are coupled to an adder 82 to redevelop signal samples $y''_i$ but with sections $1a'$ through $4a'$ of FIG. 1A restored to full amplitude.

To convert samples $y''_i$ into an analog video signal, the samples are applied to digital-to-analog converter 33 that is clocked by the field-by-field, phase alternating signal $f'_s$,ck. A low pass filter 134 has a horizontal spatial frequency cutoff of $2f_{mx}$ to remove repeat spectra having horizontal frequencies that are greater in magnitude than $2f_{mx}$. The output of low pass filter 134 provides a reconstructed baseband video signal, $V_{bd}$, having the diamond-shaped baseband spectrum 23 of FIG. 1A. The signal $V_{bd}$ also contains repeat spectra, not illustrated in FIG. 1A, that are positioned on the vertical axis $f_y$. These vertical repeat spectra are of no importance for the purposes of this discussion, as they are attenuated by the scanning process in the television receiver.

Filter 26 of FIG. 5 and filter 26' of FIG. 8 which shows the interpolator 13 of FIG. 6 perform analogous functions in frequency interleaving encoder 20 and frequency reconstructing decoder 40, respectively. Each of the two filters takes its respective signal samples and processes them to generate signal samples having diamond-shaped spectra. Thus, spatial low pass filters 26 and 26' may be similarly constructed, taking into account the fact that the input sample rate for filter 26 is twice that for filter 26'.

The extended spatial frequency luminance signal $V_{bd}$ and the chrominance signal components generated by the MAC processor, not illustrated in FIG. 6, are matrixed and supplied to the picture tube driver stages at the television receiver for display of the high definition picture content contained in these signals. Although the frequency interleaving techniques have been described by way of example for the luminance signal component of a MAC signal, similar frequency interleaving techniques may be used to extend the spatial frequencies in the chrominance signal components.

Spatial-temporal frequency interleaving of a video signal may be accomplished by means of analog processing circuitry wherein actual carrier modulation of the video signal is performed. As described in U.S. patent application Ser. No. 615,093 entitled, SPATIAL-TEMPORAL FREQUENCY INTERLEAVING OF THE SPECTRUM OF A TELEVISION SIGNAL BY MEANS RECTANGULARLY-SHAPED INTERLEAVED SECTIONS, filed concurrently herewith, by C. H. Strolle et al., herein incorporated by reference, a video signal containing a cruciform shaped spectrum may be processed to interleave the high horizontal spatial frequencies into the corners of the cruciform spectrum. The frequency interleaving is performed by modulating a carrier signal with the video signal in such a manner as to interleave the high horizontal spatial frequencies into complementary positions at lower horizontal spatial frequencies.

When such analog processing is used, the inventive concepts may be beneficially used to reduce the amplitude of the interleaved sections to avoid the introduction of aliasing artifacts. To reduce the amplitude of the interleaved sections, a reduced amplitude carrier wave may be used. At the receiver, to reconstruct the original image spectrum, a complementary carrier modulation process is performed. To restore the amplitude of the relocated section to its original amplitude an increased amplitude carrier wave is used.

What is claimed is:

1. Apparatus for interleaving the spatial-temporal frequency spectrum of an image contained in a video signal to provide an interleaved video signal having a reduced amplitude interleaved section, comprising:
  means for receiving a first signal containing an image having associated therewith an image spectrum in a spatial-temporal frequency volume;
  means responsive to said first signal for producing a second signal that represents spatial-temporal carrier modulation of a spectral section of said image spectrum into an interleaved location adjacent said image spectrum, the interleaved spectral section being made to be of reduced amplitude relative to the amplitude of the corresponding spectral section of the image spectrum; and
  means responsive to said second signal for producing an interleaved video signal that contains the reduced amplitude interleaved spectral section and a section of said image spectrum having omitted therefrom the spectral section corresponding to said interleaved spectral section.

2. Apparatus according to claim 1 wherein said second signal producing means includes means for filtering said first signal to remove from the spectrum thereof spectral content at said interleaved location.

3. Apparatus according to claim 1 wherein said second signal producing means includes means responsive to said first signal for generating digital samples therefrom to create repeat spectra that includes said interleaved spectral section.

4. Apparatus according to claim 3 wherein said digital sample generating means includes means for reducing the amplitude of selected ones of said digital samples to reduce the amplitude of said interleaved spectral section.

5. Apparatus according to claim 4 wherein the corresponding spectral section of said image spectrum contains frequencies in at least one dimension of said spatial-temporal frequency volume that are greater than the maximum frequency in that dimension that is contained in said interleaved spectral section.

6. Apparatus according to claim 5 wherein said interleaved video signal producing means includes a lowpass filter coupled to said amplitude reducing means having said maximum frequency as a cutoff frequency.

7. Apparatus according to claim 3 including a spatial filter responsive to said digital samples for removing from the spectrum thereof spectral content at said interleaved location.

8. Apparatus for reconstructing the spatial-temporal frequency spectrum of an image contained in a spatial-temporal frequency interleaved video signal having a reduced amplitude interleaved section, comprising:
   means for receiving a spatial-temporal frequency interleaved video signal containing a spatial-temporal frequency spectrum of an image with a section of the image spectrum being omitted therefrom, said interleaved video signal further containing an interleaved section located in a complementary position adjacent said image spectrum, said interleaved section corresponding to the omitted section of said image spectrum, said interleaved section being of reduced amplitude relative to the amplitude of another section of the spectrum of said interleaved video signal;
   means responsive to said interleaved video signal for producing a second signal that represents spatial-temporal carrier modulation of said interleaved section to restore that section to its original position in the image spectrum while increasing the amplitude of the restored section over its reduced amplitude value;
   means responsive to said interleaved video signal for producing a third signal that represents said another section of said image spectrum; and
   means responsive to said second and third signals for producing a signal that represents a reconstruction of said image spectrum with the restored section having increased amplitude relative to the corresponding interleaved section in the received video signal.

9. Apparatus according to claim 8 wherein said second signal producing means comprises means for generating digital samples of said interleaved video signal and means for increasing the amplitude of selected ones of said digital samples relative to other ones of said digital samples.

10. Apparatus according to claim 8 wherein the restored section of the reconstruction of said image spectrum contains spatial frequencies in at least one dimension that are greater than the maximum frequency in said one dimension that is contained in said interleaved section.

11. Apparatus according to claim 8 wherein said second signal producing means comprises means for generating quincunx samples of said interleaved video signal, a spatial highpass filter coupled to said quincunx sample generating means and a gain device coupled to said spatial highpass filter for increasing the amplitude of the samples developed and the output of said spatial highpass filter.

12. Apparatus according to claim 11 wherein said third signal producing means comprises a spatial lowpass filter coupled to said quincunx sample generating means and wherein said means responsive to said second and third signal comprises an adder coupled to said low and highpass filters.

13. Apparatus according to claim 12 wherein the restored section of the reconstruction of said image spectrum contains spatial frequencies in at least one dimension that are greater than the maximum frequency in said one dimension that is contained in said interleaved section and wherein the cutoff frequencies of said low and highpass filters are each substantially that of said maximum frequency.

* * * * *